(12) United States Patent
Harrison

(10) Patent No.: US 7,347,896 B2
(45) Date of Patent: Mar. 25, 2008

(54) REACTIVE MAGNESIUM OXIDE CEMENTS

(75) Inventor: Aubry John Weston Harrison, Tasmania (AU)

(73) Assignee: Tececo Pty Ltd, Tasmania (AU)

( * ) Notice: Subject to any disclaimer, the term of this patent is extended or adjusted under 35 U.S.C. 154(b) by 0 days.

(21) Appl. No.: 11/016,722

(22) Filed: Dec. 21, 2004

(65) Prior Publication Data

US 2005/0103235 A1    May 19, 2005

Related U.S. Application Data

(63) Continuation of application No. 10/181,442, filed as application No. PCT/AU01/00077 on Jan. 29, 2001, now abandoned.

(30) Foreign Application Priority Data

Jan. 27, 2000 (AU) .................... PQ5271
May 1, 2000 (AU) .................... PQ7181

(51) Int. Cl.
C04B 9/12       (2006.01)
(52) U.S. Cl. .................. 106/738; 106/685; 106/686; 106/688; 106/801; 106/802
(58) Field of Classification Search .............. 106/801, 106/802, 685, 686, 688, 738
See application file for complete search history.

(56) References Cited

U.S. PATENT DOCUMENTS

| | | | |
|---|---|---|---|
| 1,456,667 A | | 5/1923 | Berry |
| 2,155,139 A | | 4/1939 | MacIntire |
| 2,511,725 A | * | 6/1950 | Lobaugh |
| 2,880,101 A | | 3/1959 | Ulfstedt |
| 3,202,520 A | | 8/1965 | Enoch |
| 3,960,580 A | | 6/1976 | Stierli et al. |
| 4,002,483 A | | 1/1977 | Daugherty et al. |
| 4,003,752 A | | 1/1977 | Isohata et al. |
| 4,011,094 A | * | 3/1977 | Burley |
| 4,113,834 A | * | 9/1978 | Show et al. ................ 423/155 |
| 4,115,138 A | * | 9/1978 | Nudleman et al. |
| 4,257,815 A | * | 3/1981 | Hauser .................. 106/DIG. 1 |

(Continued)

FOREIGN PATENT DOCUMENTS

AU       1160029       7/1969

(Continued)

OTHER PUBLICATIONS

Material Specification Sheet "Eastomag® 170"—Rohm et al, no date available.

(Continued)

*Primary Examiner*—Paul Marcantoni
(74) *Attorney, Agent, or Firm*—Dennison, Schultz & MacDonald

(57) ABSTRACT

Novel hydraulic cements are disclosed that include reactive magnesium oxide prepared by low temperature calcination. The cements can be formulated to suit a large number of applications with various setting times, strength and levels of sustainability either by adding iron salts such as ferrous sulfate or blending with other compatible faster setting hydraulic cements such as Portland cement or by using both methods.

The compositions are able to incorporate relatively large amounts of low cost pozzolans such as fly ash to advantage as well as wastes. Many excellent properties are exhibited and in particular good comprehensive strength and resistance to sulfates is able to be achieved.

12 Claims, 1 Drawing Sheet

U.S. PATENT DOCUMENTS

| | | | |
|---|---|---|---|
| 4,572,862 A | 2/1986 | Ellis | |
| 4,734,133 A | 3/1988 | Sherif et al. | |
| 4,760,039 A | 7/1988 | Hlawatachek | |
| 4,797,159 A | 1/1989 | Spangle | |
| 4,838,941 A | 6/1989 | Hill | |
| 5,130,051 A | 7/1992 | Falk | |
| 5,180,429 A | 1/1993 | Khasnov | |
| 5,194,087 A * | 3/1993 | Berg | 501/108 |
| 5,195,087 A | 3/1993 | Berg | |
| 5,228,913 A * | 7/1993 | Hinterwaldner et al. | 106/603 |
| 5,565,026 A * | 10/1996 | Hense et al. | 106/600 |
| 5,669,968 A * | 9/1997 | Kobori et al. | 106/696 |
| 5,897,703 A | 4/1999 | Hatakeyama et al. | |
| 5,942,031 A | 8/1999 | Cheung | |
| 6,200,381 B1 | 3/2001 | Rechichi | |
| 6,231,664 B1 * | 5/2001 | Chatterji et al. | 106/724 |
| 7,070,647 B2 * | 7/2006 | Fujimori et al. | 106/691 |
| 2005/0103235 A1 * | 5/2005 | Harrison | 106/801 |

FOREIGN PATENT DOCUMENTS

| | | |
|---|---|---|
| AU | 55715/73 | 11/1974 |
| AU | 7355715 | 11/1974 |
| CN | 1247177 | 9/1999 |
| DE | 908837 | 7/1949 |
| EP | 0650940 | 5/1995 |
| FR | 890325 | 2/1994 |
| GB | 871428 | 6/1961 |
| GB | 938853 | 10/1963 |
| JP | 52-138522 | 11/1977 |
| JP | 55-037469 | 3/1980 |
| JP | 5537469 | 3/1980 |
| JP | 5795858 | 12/1980 |
| JP | 57056364 | * 4/1982 |
| JP | 57188439 | 11/1982 |
| JP | 59-083970 | 5/1984 |
| JP | 5983970 | 5/1984 |
| JP | 59-105882 | 6/1984 |
| JP | 59105882 | 6/1984 |
| JP | 7-069706 | 3/1995 |
| JP | 769706 | 3/1995 |
| KR | 9508585 | 3/1995 |
| RU | 2028335 | 2/1995 |
| RU | 2089525 | 9/1997 |
| RU | 2102349 | 1/1998 |
| RU | 2158718 | 10/2000 |
| SU | 104719 | 1/1957 |
| SU | 172217 | 6/1965 |
| WO | 9011976 | 10/1990 |
| WO | 9720784 | 6/1997 |
| WO | 9854107 | 12/1998 |
| WO | 0005178 | 2/2000 |

OTHER PUBLICATIONS

Material Specification Sheet "Elastomag® 100"—Rohn et al, no date available.

Jung et al, "Technology of Binding Materials" 1957.

Gelling Material Science Compilation Group Eds, Chinese Building Industry Publishing House "Gelling Material Science"—1980.

Ramachandran A Test for Unsoundness of Cements Containing Magnesium Ocide, VTT Symposium 1984, vol. 2.

Skalmowski Chemistry of binding Materials, Arkady, 1971.

Ramachandran Concrete Science, Hayden et al, 1981.

Shand "Premier Chemicals, Magnesia Cements".

* cited by examiner

REACTIVE MAGNESIUM OXIDE CEMENTS

This application is a continuation of Ser. No. 10/181,442 filed Sep. 19, 2002, now abandoned which is a filing under 35 USC 371 of PCT/AU01/00077, filed Jan. 29, 2001.

TECHNICAL FIELD OF THE INVENTION

This invention relates to magnesium cements and in particular to cements containing magnesium oxide (magnesia).

BACKGROUND TO THE INVENTION

A number of cements based on magnesia have previously been made. If a salt such as magnesium chloride or sulfate is added to reactive magnesia and the mixture is allowed to react and hydrate magnesium oxychlorides and magnesium oxysulfates are formed that can be very strong but are not sufficiently weatherproof and are corrosive. Although there are many patents describing improvements to overcome these deficiencies such as the use of phosphates or soluble silicates, they are not generally economic.

Magnesium oxychlorides were first discovered and prepared by Sorel in 1867. Magnesium oxysulfates were discovered by Olmer and Delyon in 1934. Magnesium oxychlorides and oxysulfates are commonly referred to as Sorel cements.

A number of compounds are formed when magnesia reacts with magnesium chloride to form oxychlorides. The main bonding phases so far found in hardened cement pastes are $Mg(OH)_2$, $(Mg(OH)_2)_3.MgCl_2.8H_2O$ and $(Mg(OH)_2)_5.MgCl_2.8H_2O$. $(Mg(OH)_2)_5.MgCl_2.8H_2O$ has superior mechanical properties and is formed using a molar ratio of $MgO:MgCl_2:H_2O=5:1:13$

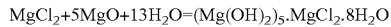

If magnesium sulfate is used instead four oxysulfate phases are considered to form at temperatures between 30 and 120° C.; $(Mg(OH)_2)_5MgSO_4.3H_2O$, $(Mg(OH)_2)_3.MgSO_4.8H_2O$, $Mg(OH)_2.MgSO_4.5H_2O$, and $Mg(OH)_2.2MgSO_4.3H_2O$. Only $(Mg(OH)_2)_3.MgSO_4.8H_2O$ is stable below 35° C.

$$3MgO+MgSO_4+11H_2O=(Mg(OH)_2)_3.MgSO_4.8H_2O$$

Zinc, calcium, copper and other elements also form similar compounds.

Magnesium oxychlorides achieve higher compressive strengths than magnesium oxysulfates. The main problem with Sorel cements is that both magnesium oxychlorides and magnesium oxysulfates tend to break down in water and particularly in acids. Corrosion of steel reinforcing also occurs.

The use of soluble silicates such as sodium silicate has been described as a means of improving the water resistance of Sorel type cements. These cements are of little practical use however because of the high cost of soluble silicates.

Magnesia also reacts with soluble phosphates to precipitate almost totally insoluble magnesium phosphate, $$MgO+H_2O=Mg(OH)_2$$

$$3Mg(OH)_2+2H_3PO_4=Mg_3(PO_4)_2+6H_2O$$

The use of phosphates has also been advocated as a means of improving the water resistance of Sorel type cements. Such cements, although described in the literature, are expensive due to the shortage of economic deposits of phosphate and as a result widespread use is limited.

A range of magnesium phosphate cements has been used including magnesium ammonium phosphate which is thought to be formed by an acid-base reaction between magnesia and di hydrogen ammonium phosphate. This results in an initial gel formation followed by crystallisation into an insoluble phosphate, mainly magnesium ammonium phosphate hexahydrate, $[NH_4MgPO_4.6H_2O]$. The magnesium oxide used in this system is produced by calcining at higher temperatures and is referred to in the industry as being "dead burned" and is not as reactive as magnesia made at lower temperatures. A set retarder, typically either borax or boric acid is also used to give a workable set time.

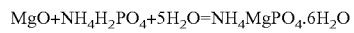

High-lime magnesiochrome cement finds use in refractories. The cement is based upon magnesia plus calcium chromate—chromite, a complex mineral produced by the combination of lime with chrome oxide $(Cr_2O_3)$ in an oxidising environment. Hydration is normally performed with a 30% aqueous solution of magnesium chloride hexahydrate $(MgCl_2.6H_2O)$ solution at 8 percent by weight of the cement. The products are complex. As well as hydrates they also consist of carbonates, which are formed by the effects of carbonation. Typical products formed can include brucite $[Mg(OH)_2]$, various magnesium oxychlorides $[(Mg(OH)_2)_x.MgCl_2.YH_2O.]$ calcium chromate dihydrate $(CaCrO_4.2H_2O)$, calcium monochromite $(CaCr_2O_4)$ portlandite $[Ca(OH)_2]$, secondary magnesium carbonate $(MgCO_3)$, secondary calcium carbonate $(CaCO_3)$ and mixed calcium magnesium carbonates $[(Ca,Mg)CO_3]$.

Other known cementitious magnesia compounds include hydroxychlorides and sulfates such as $Mg(OH)_2.MgCl_2.8H_2O$, hydroxy carbonates $[Mg_5(OH)_2(CO_3)_4.4H_2O]$ and hydroxy chloro carbonates [e.g. $Mg_2OHClCO_3.3H_2O$] as well as hydro magnesite and magnesite. Hydroxy chloro carbonates and sulfates are also formed as a result of atmospheric carbonation of magnesium oxy chloride and magnesium oxy sulphate, and these often ultimately revert to magnesite and hydromagnesite.

Brucite $[Mg(OH)_2]$ alone has not found much commercial use as a cement previously mainly because the setting rate is too slow.

Most hydraulic cements are calcium based and apart from calcium aluminate and some slag cements, generally contain ground Portland type clinkers and are classified as Portland type cements by standards developed in most countries to ensure their quality. In Europe a large number of countries have been involved in the development of what is referred to as the European Prestandard for Common Cements (ENV 197-1:1992) which covers a wide range of formulations including Portland cements, Portland—slag cements (including slag from steel making), Portland silica fume cements, Portland pozzolana or flyash cements, Portland burnt shale cements, Portland limestone cements, Portland composite cements, blast furnace cements, pozzolanic cements and various composite cements.

In America the American Society for Testing and Materials (ASTM) is the major contributor to the classification of common cements. Applicable standards are C 150-95 (Standard specification for Portland cement), C219-94 (Standard terminology relating to hydraulic cement) and C595M-95 (Standard specification for blended hydraulic cements). Other hydraulic cements include geopolymers which are based on poly(silico-oxo-aluminate) or (—Si—O—Al—O—)n (with n being the degree of polymerization). Geopolymers are formed from the geosynthesis of poly (silisic) acid $(SiO_2)n$ and potassium alumina-silicate, in aqueous alkali medium (KOH, NaOH), Ca(OH)$_2$, Mg(OH)$_2$ etc.) As water is required to synthesise the precursors that polymerise in the reaction, the cement is considered to be hydraulic in terms of the definition cited.

Carbonation in contact with the atmosphere generally occurs with most hydraulic cements included in modern standards as well as with magnesium cements. When considered beneficial carbonation is sometimes forced by using richer than atmosphere sources of carbon dioxide and carbonation has even been considered as a means of sequestration. In the case of magnesium cements carbonation has been found to generally add strength and the process is therefore often encouraged. The cements the subject matter of this invention, particularly those with a high proportion of magnesia, carbonate more rapidly than either Portland type cements or the magnesium oxy chlorides and magnesium oxy sulfates previously mentioned.

SUMMARY OF THE INVENTION

The invention provides in one form a cement composition that includes reactive magnesium oxide at a level of at least 5% w/w of hydraulic cementitious components in the composition excluding pozzolans wherein the magnesium oxide is prepared by low temperature calcination and fine grinding and wherein the hydraulic cementitious components exclude magnesium oxychlorides and magnesium oxysulfates.

The cementitious components may include any hydraulic cement defined in ASTM C219-94 as "a cement that sets and hardens by chemical interaction with water and that is capable of doing so under water." This definition includes a wide range of cements including but not limited to Portland and blended Portland type cements listed by the various standards, slag cements, calcium aluminate type cements, alite cements, belite cements, ferrari cements lime cements and geopolymers. as well as sulfates other than the excluded magnesium salts. Pozzolans defined by ASTM C219-94 as a siliceous and aluminous material, which in itself possesses little or no cementitious value but which will, in finely divided form and in the presence of moisture, chemically react with calcium hydroxide at ordinary temperatures to form cementitious hydrates (including wastes) and fillers are not regarded as hydraulic cementitious components in this specification.

Preferably the ratio of reactive magnesia to ground Portland clinker is in the range 1:3 to 2.5:1.

Preferably the composition further includes at least 10% of a pozzolan w/w.

In one form the composition further includes at least 80% of a pozzolan w/w.

Preferably the pozzolan is fly ash.

Preferably the hydraulic cement composition includes ground Portland cement clinker type minerals.

DETAILED DESCRIPTION OF THE INVENTION

Figure 1:
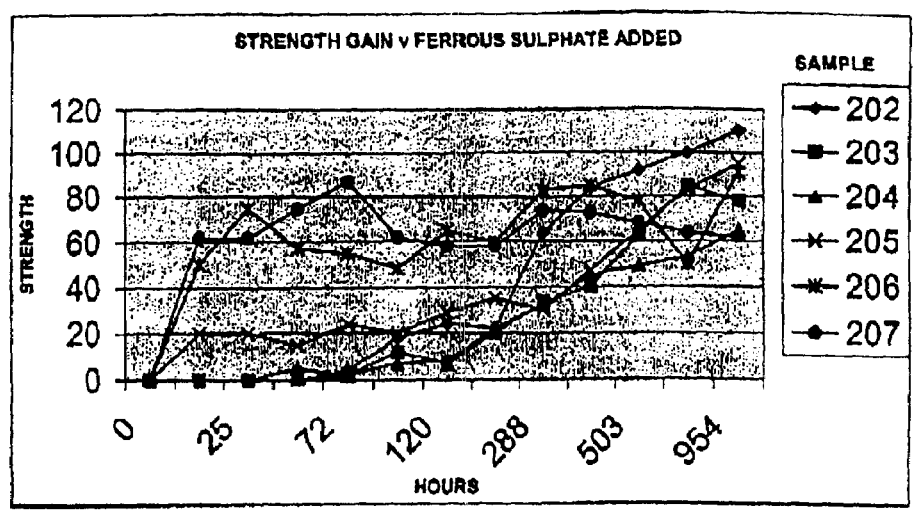
FIG. 1 is a graph of strength vs. ferrous sulfate content for a cement containing magnesia and fly ash.

The present invention provides cement compositions containing substantial proportions of reactive magnesia that hydrates to form brucite which is a useful cementitious component. They generally but not always contain a high proportion of pozzolans, many of which are wastes such as fly ash.

The compositions include the blending of reactive magnesia with hydraulic cements, preferably Portland cements but also other cements including other magnesium cements and/or the use of various accelerators as a means of improving the setting and hardening times and early strength. Both blending with other cements and the use of accelerators as formulation strategies can be used independently, or sometimes combined to advantage rendering brucite useful as a binder in a cement matrix.

When other commercially usefail cements are blended as a minor constituent with reactive magnesia in the formulations provided for in this invention ultimate strength is improved. Reactive magnesia in turn, when added as a minor constituent to other hydraulic cements, provides a virtually insoluble matrix of high pH in which most other cements are stable and affords a degree of protection in normally aggressive solutions such as sulfates.

The blending of reactive magnesia (MgO) with ground Portland cement clinker or more specifically ground mineral products from the calcining of mixtures of limestone and clays or other sources of calcium, silica and aluminium used in the manufacture of Portland and other cements, such as di calcium silicate [Ca$_3$SiO$_5$ or alite (in nature hatrurite)], tri calcium silicate [Ca$_2$SiO$_4$ or belite (in nature larnite), tri calcium aluminate [Ca$_3$Al$_2$O$_6$], ferrites [e.g Ca$_3$(Fe,Al)$_{o6}$] and free lime Ca(OH)$_2$ either in a blend (such as Portland cement) or individually has been discovered to be a good strategy for improving the rate of strength gain and ultimate strength of cements based on reactive magnesia as a mineral binder.

Although virtually any proportion can be used effectively, it has been observed that at even a very high ratio of 80-98% of a pozzolan such as fly ash with 2-20% reactive magnesia and ground Portland clinker hardens well. The magnesium oxide and ground Portland clinker weight ratio may vary depending on the rate of strength gain and ultimate strength required or desired sustainability. Typically the ratio of reactive magnesia to ground Portland clinker is in the range 1:3 to 2.5:1. Higher proportions of the magnesia—Portland component results in more rapid setting times, particularly when the ratio of Portland cement to reactive magnesia is also higher.

The addition of pozzolans is not necessary as a strong cement is produced by merely blending Portland cement clinker minerals and reactive magnesia. However, they are useful as they have, most often only when activated, but sometimes depending on their composition without activation, cementitious properties. They also serve to mask the slower setting times of the magnesia component, preventing structural defects and if they are also wastes, they reduce costs.

The use of accelerators is both an additional and alternative technique to improve early setting and hardening times of cements. If accelerators such as ferrous sulfate are used whether with blends of reactive magnesia and pozzolans alone (an alternative technique) or also with other cementitious components (an additional technique) they are added in small proportion only (less than 20% of the MgO proportion).

A particular embodiment of the strategy of blending magnesia with Portland clinker minerals was made with the following proportions that achieved high strengths in the order of 12-20 mpa after pre curing for 48 hours followed by steaming at 55° C. for 48 hours and then further curing for a period of three weeks.

The composition was made by mixing as dry powders 600 g (94% by weight) fly ash from the Gladstone power station in Australia, 30 g (4.67% by weight) reactive magnesia ground to 95% passing 45 micron and 100% passing 125 micron (branded as XLM and from Causmag in Australia) and 12 g (1.87% by weight) ground Portland cement clinker ground to 100% less than 125 micron from Australian Cement in Railton Tasmania. Water was added to make a stiff paste and this was then vibrated into moulds. After approximately six weeks the sample reached a strength approaching 20 mpa and was resistant to sulfates and other solutions aggressive to Portland cement.

In another example in which the advantage of using reactive magnesia in ordinary concrete was tested a concrete composition was made by mixing as dry powders 5,000 g (5% by weight) fly ash from the Gladstone power station in Australia, 2,000 g (2.00% by weight) reactive magnesia ground to 95% passing 45 micron and 100% passing 125 micron (branded as XLM and from Causmag in Australia), 12,000 g (12% by weight) ground Portland cement clinker ground to 100% less than 125 micron from Australian Cement in Railton Tasmania, 31,000 g (31% by weight) of course sand from Hobart Blue Metal Industries in Hobart, Tasmania and 50,000 g (50% by weight) of 12 mm aggregate from Boral Quarries Bridgewater in Tasmania Water was added to make a stiff paste and this was then vibrated into moulds. After approximately six weeks the sample reached a strength exceeding 25 mpa and was resistant to sulfates and other solutions aggressive to concrete made with Portland cement with no added reactive magnesia.

Portland cements containing magnesium oxide are currently termed "unsound" and the use of limestones containing magnesium for making Portland cements is avoided. The reason why is because when magnesite or dolomite, present as an "impurity" contained in limestone, is slaked at high temperatures during the manufacture of Portland cement, a highly unreactive oxide termed "dead burned magnesia" is produced and added hydrates long after other cementitious components.

Magnesite ($MgCO_3$) begins decomposing to the oxide at a substantially lower temperatures and pressure than limestone ($CaCO_3$) This is true of mixtures of limestone and magnesite as well as for the distinguishable mineral dolomite which contains both magnesium and calcium as carbonates.

| Reaction | Atomic No. of metal | Enthalpy $\Delta H°$ (kcal) | Entropy $\Delta G°$ (kcal) | $T(PCO_2 = 1 \text{ atm})$ |
|---|---|---|---|---|
| $MgCO_3 =$ MgO + $CO_2$ | 12 | 28 | 16 | 540° C. |
| $CaCO_3 =$ CaO + $CO_2$ | 20 | 42 | 31 | 900° C. |

Portland cement is typically made between 1450° C. and 1500° C. At these temperatures any magnesium carbonate content becomes unreactive due to the formation of larger more defined crystals with less surface area and lower porosity than at lower temperatures. Magnesia produced in this manner, referred to as 'dead burned', is unreactive and hydrates very slowly—usually long after the other components in a cement such as Portland cement have hydrated. As a result stresses are introduced resulting in what is often termed unsound cement. Because of this magnesium oxides have been condemned for many years in Portland cement. Unreactive magnesia is also unsuitable for use in the present invention.

The key for the successful blending of magnesia and other cements and in particular Portland type cements is that the hydration rates of all components in the cement must be matched. In order to achieve this the magnesia component must be separately calcined at lower temperatures and in conditions that are suitable for the manufacture of reactive magnesia, ground to a fine size depending on the reactivity required and only then blended with other cementitious components, pozzolans or both.

Suitable magnesia should be calcined at low temperatures (less than 750° C.) and ground to greater than 95% passing 120 micron. Generally the lower the temperature of calcination and finer the grind, the more reactive the magnesia is and the faster it hydrates. Magnesia calcined as 650° C. passing 45 micron or less is better.

A suitable test for reactivity is the citric acid test and low temperature calcined magnesia ground to 95% passing 45 micron tests at about 10 seconds using this method which uses 0.5 g sodium benzoate, 28 g citric acid monhydrate and 0.1 g phenolphthalein dissolved in water and diluted to 1 liter.

If the above small amounts of sodium benzoate and phenolphthalein do not dissolve, a small amount of methylated spirits should be used as well. The prepared solution is stored in a water bath at 30° C.±0.2° C.

The test method is to first weigh a 2.00 g sample of magnesia on a watch glass. Then Pipette 100 ml of the prepared solution in to a dry 250 ml tall form beaker. Add the 2.00 g powder sample previously weighed and stir (preferably with a magnetic stirrer) immediately. Record the time in seconds for the stirred solution to turn pink.

The reactivity and hydration rates of hydraulic cements, and in particular Portland clinker products, magnesia and lime are affected by the temperature and conditions of calcining as well as the particle porosity, texture and size and the porosity, texture and size of interspersed components such as pozzolans including fly ash and can therefore be engineered to match mainly by varying slaking temperatures and grind sizes.

It is important that volume changes are approximately neutral to prevent structural defects occurring during setting and volume changes are related to reactivity.

Consider the volume changes that occur when magnesia hydrates:

11.2+18.0=24.3 molar volumes.

If this reaction is slow as is the case with "dead-burned" magnesia produced as a result of high temperature calcining it occurs after all the free mixing water has been taken up by hydration of other cementitious minerals. For example, during the manufacture of Ground Portland clinkers, the main minerals produced are alite and belite, Alite hydrates more rapidly than belite however hydration proceeds much more rapidly with both than for the "dead burned" magnesia component present as an impurity contained in limestone for example. All the free moisture is used up before hydration of magnesia can proceed to completion and for the reaction to proceed then moisture must be absorbed by the mass over and above the original mixing water resulting in a net volume increase of 24.3−11.2=13.1 molar volumes. Hence cracking occurs leading to the bad name of magnesia contained—as an impurity in Ground Portland clinkers.

If finely ground magnesia that is highly reactive is added after the calcining process required for the manufacture of most other cements such as Portland cement, the same hydration reactions occur but much more rapidly. As a result the moisture is absorbed more rapidly and mainly from the mix water and there is no net absorption of moisture that was not contained in the original mix. In terms of molar volumes from the above equation, MgO (11.2)+$H_2O$ (18.0)=Mg$(OH)_2$ (24.3). The volume of the reactants is more than the products by some 4.9 molar volumes, and this small amount is taken up from pore water.

It is desirable with the composition of the present invention to maintain a moist environment particularly after the first few hours curing and it has been determined that approximately neutral volume changes result if this is the case, resulting in little or no stresses that have to be accommodated.

The hydration of reactive magnesia added during the final blending or grinding stages of the manufacture of a cement is sufficiently rapid to allow most volume adjustments that there are to occur before restraining strength is achieved by the other cementitious components preventing stresses from developing that cause structural defects.

As the magnesia component of the cements provided for in this invention hydrates, brucite is formed which is highly insoluble (Ksp $1.8 \times 10^{-11}$, equivalent to 0.18 g/liter) and it blocks off access to water for further hydration.

The addition of pozzolans such as fly ash tends to reduce the amount of brucite that needs to form for strength to develop and negates the blocking off affect of the advancing brucite reaction front as well as taking up minute volume changes (if any) and acting as a microaggregate at a microscopic level.

Pozzolans including natural pozzolans and artificial pozzolans such as fly ash and other wastes also react with alkalis including reactive magnesia and the free lime component included in Portland cement clinker products and formed as a result of the hydration of calcium silicates to produce more calcium silicate hydrates that further bond the components of the cement together. The free lime in the cements contemplated by this invention containing pozzolans is replaced by brucite which has a similar reduction and oxidation potential but much lower solubility.

Inter particle surface interaction also results in chemical as well as physical bonding between fine grains of pozzolan and other cementitious components and between the pozzolan grains themselves. This is mainly due to hydration reactions but also surface hydrolysis and geopolymeric reactions particularly if an alkali such as provided by the more soluble portlandite phase (Portlandite or calcium carbonate has a Ksp of $5.5 \times 10^{-6}$ or solubility of 1.37 g/liter) of Portland cement is present or separately added.

These reactions occur later during the hardening of the cements described by this specification as the more soluble alkalis become concentrated as other cement components such as calcium silicate and magnesium hydrate and use up mixing water.

The grains of pozzolan also provide nucleation sites for the hydration of other components of the cement.

In this specification the term pozzolan which has been defined includes materials containing silicon and aluminium that react with or are activated by an alkali, and in the presence of water form stable silicon and aluminium compounds.

There are two basic kinds of wastes and both can effectively be used with the compositions of the present invention.

Wastes which are pozzolans and which contribute to strength given the longer term or shorter periods if accelerated by accelerators also described or by heating preferably in a moist environment. Examples are wastes produced by the agriculture and mining industry in increasing amounts such as reactive fly ash, flue wastes, slags including iron ore slag, and other wastes from the metal production industry as well as silica fine, ground brick, and sewerage sludge ash.

Passive wastes take no chemical part in the formation of a cement and include, sawdust, unburnt rice husks, some mine tailings, mineral extraction wastes etc. and virtually all may be used as fillers. A high proportion can be added without loss in strength and add to abrasion resistance (and in many cases workability). If fine enough they act as micro aggregates and often result in greater strength.

Of the pozzolanic wastes available in quantity cheaply, fly ash is economically the most important and has been found to make a slightly better cement when combined with magnesia than ground vitrified iron ore slag and the reasons for this could be that the heat treatment has been more appropriate and the silicon alumina ratio is closer to ideal proportions.

Ground bauxite or brick has been found to increase strength when added to mixtures of magnesia and fly ash. As mixtures of magnesia and silica fume hardly show any strength but mixtures of magnesia silica fume and bauxite do the increased reactivity due to the inclusion of bauxite is probably a function of the addition of alumina, but this has not been proven as it may also be due to a concentration effect.

It has also been found possible to include amounts of waste containing alumina such as "red mud" which is a waste form the aluminium industry.

The best results with "red mud" have been obtained when ferrous sulfate was also added in small amounts (1-20% of the MgO proportion). As red mud contains soluble sodium compounds, particularly sodium carbonate, sodium sulfate is produced and could be effectively recovered. The carbonates remain as siderite, or alternatively combine with the magnesium forming magnesite and hydromagnesite.

Bauxite may also be used as a source of alumina depending on the alumina content of the primary waste and is available in large quantities at low cost. Bauxite consists mainly of gibbsite ($Al_2O_3.3H_2O$), boehmite ($Al_2O_3.H_2O$), and diaspore. Diaspore has the same composition as boehmite but is denser and harder.

Sewerage sludge ash, besides being a source of reactive silica and alumina and therefore a pozzolan, is a rich source of soluble phosphates. The phosphates react readily with magnesia forming mostly stable insoluble phosphates which have good binding properties.

The residue from burning organic wastes such as rice husks is also reactive and may contain ideal quantities of silica and alumina.

The addition of gypsum, limestone and other additives normally used in Portland cement is usually unnecessary. As gypsum does not appear to be deleterious and may even have a small advantage as a set regulator for the Portland cement component, accelerator for the magnesium oxide component and flocculation agent, commercial Portland cement containing a small percentage of ground gypsum may be used as an alternative to pure ground Portland clinker materials in virtually any ratio.

The addition of ground limestone, often added to Portland clinker with which it has some reactions, has little or no affect to the reactive magnesia component and this is an advantage as it allows the use of impure magnesite for the manufacture of reactive magnesia for use pursuant to this invention. At the low temperatures used to produce reactive magnesia and particularly with the use of fluxes such as sodium fluoride or chloride, limestone does not react and remains un-slaked and inert with respect to magnesia, acting merely as a filler.

Most commercial sources of magnesia contain small quantities of calcium and normally at the temperatures at which reactive magnesia is calcined (550-750° C.) the calcium remains as calcium carbonate which other than absorbing more energy to produce and slowing reactions down, does not interfere with the setting of cements containing a high proportion of reactive magnesia described in this invention.

When the atomic ratio of magnesium to calcium approaches one as in dolomite (or greater) these materials are less suitable as the calcium carbonate functions merely as an inert filler slowing down reactions. In this specification the term reactive magnesium oxide thus excludes reactive magnesium oxide sourced from dolomite.

Reactive magnesia added during the final stages of manufacture of other cements such as calcium aluminate cements, slag cements, and geopolymeric cements etc. can also be an advantage.

As with Portland cement the key is to match the hydration rates and to do this reactive magnesia is required.

There are three classes of accelerants that can be used in the composition of the present invention:
1. Alkaline chemicals which mobilise silica and alumina.
2. Acids and salts of acids.
3. Organic accelerators.

Alkaline chemicals that accelerate the setting of Portland cement include chemicals such as alkali and alkali earth hydroxides, carbonates, formates, aluminates and silicates.

Small dosages of alkaline accelerants work with the composition of the present invention. If Portland cement is included in the blend they aid the formation not only of calcium aluminates but also of calcium silicates by mobilising silica and alumina, both of which are much more soluble in an alkaline environment.

Some of the alkaline accelerants that have been tested are listed below in order of effectiveness.

| Accelerant | Effectiveness (1-10) |
|---|---|
| Sodium aluminate | 8 |
| Sodium silicate | 8 |
| Sodium carbonate | 7 |
| Sodium hydroxide | 2 |

The most affective in this group are sodium silicate and sodium aluminate, and of these sodium silicate is known to be an accelerator of geopolymeric reactions.

Another group of accelerants are acids and in particular soluble salts of acids and generally both the cation and anion contribute to the overall affect facilitating the dissolution of magnesia and lime. Although early setting is accelerated long term strength is generally reduced.

According to Rodney M Edmeades and Peter C Hewlett in Lea's Cement and Concrete (Arnold, 4$^{th}$ edition) anions that cause significant acceleration with Portland cements are halides, nitrates, nitrites, formates, thiosulfates and thiocyanates. Their activity also appears to depend on the associated cation and research has shown that with Portland cement divalent and trivalent cations such as calcium, magnesium, barium and aluminium appear to be more affective than monovalent ions such as sodium, potassium and ammonium.

Other acidic accelerants not mentioned by the above authors include sulfates such as ferrous sulfate and calcium or aluminium sulfate.

A commonly used accelerant in this group with Portland cement used to be calcium chloride until usage was banned in many countries because of corrosion problems with reinforcing.

All of the above accelerants appear to work with the high magnesia cements that are the subject matter of this application having the affect of causing more rapid dissolution of magnesium hydroxide and in the case of blends with Portland cement, other cementitious components as well.

A number of salts have been tested and found to work in order of effectiveness as hereunder:

| Accelerant | Effectiveness (1-10) |
|---|---|
| Calcium chloride | 8 |
| Ferrous sulphate | 8 |
| Potassium nitrate | 8 |
| Sodium sulphate | 8 |
| Calcium nitrate | 8 |
| Aluminium potassium sulphate | 6 |
| Sodium chloride | 6 |
| Aluminium sulphate | 4-3 |

Of the above, one of the best and potentially the cheapest accelerators is ferrous sulfate. With accelerators that are salts of acids such as ferrous sulfate, it is important to note that initial setting may be accelerated, but the addition of too much does not contribute to longer term hardening and can be deleterious.

Good results have also been obtained with organic agents that hydrolyse silica and alumina and an example is triethanolamine.

In the case of Portland cement, triethanolamine works by combining with aluminum dissolving tricalcium aluminate prior to formation of tricalcium aluminate hydrate. Too much causes retardation of tricalcium silicate hydrate. With cements also containing reactive magnesia triethanolamine works in a similar manner by dissolving and mobilising aluminate.

Iron salts including sulfates and chlorides and in particular ferrous sulfate are the most recommended accelerants because of cost and environmental benefits as many of them are wastes.

As previously mentioned, reactive magnesia can be blended with a range of hydraulic and chemical cements and iron salts can also be used in many such blends including the commercially more important blends with ground Portland clinker minerals discussed. The quantity added should be kept as low as possible to achieve the required initial set. Iron salts do not appear to contribute to final strength, and if too much is added this may even be reduced.

Ferrous sulfate is recommended in most instances because it is less aggressive than ferric sulfate or ferrous or ferric chloride for instance and also cheaper. A small percentage (0.5-20% of the MgO content) of ferrous sulfate is effective in accelerating the initial setting of cements made using a proportion of added reactive magnesium oxide and in particular with blends of such cements with pozzolans including pozzolanic wastes such as fly ash. The amount added depends on a number of factors including the reactivity of the magnesia and other components of the cement.

The specific role of iron salts is to speed up initial setting. Small quantities do not appear to affect final strength and hardness however if too much is added reactions are too rapid and cracking and increased susceptibility to weathering result.

A major advantage of using iron salts and in particular ferrous sulfate as accelerants is the low cost of the salts. Ferrous sulfate is also not anywhere near as hygroscopic as either magnesium sulfate or magnesium chloride used in the manufacture of Sorel cements and in a dry atmosphere it can be ground to a fine size enabling the economical production of "all in the bag" mixes.

Experiments have shown that with cements containing a high proportion of reactive magnesia small quantities (0.5 to 20% of the MgO content) of ferrous sulfate reduces setting times considerably and it is possible to cause such cements to set with sufficient moulding strength (0.5-5 mpa) within just a few hours. Some: other sulfate or chloride salts of elements with a similar ionic radius to iron and of similar charge have a similar affect but are not cost effective. e.g salts of manganese.

It is recommended that the amount and type of iron salt added is determined by trial and error as the reactions in the case of pure magnesia depend on the reactivity of the magnesia, particle size etc. and if pozzolans including wastes such as fly ash are also added, are heavily masked. Other blended wastes may also have a masking affect and more or less quantity or more or less aggressive iron salts may need to be used depending on the nature of the waste, be it fly ash, sewerage ash, rice husks etc all of which vary in reactivity. As the reaction of magnesia with iron salts is exothermic, and can get too warm if too much iron salt is added, care needs to be taken. Whether or not steam or autoclaving is also used needs to be considered as reaction rates roughly double with every 10° rise in temperature, whereas increases in pressure do not have quite such a marked effect.

The use of iron salts is more advantageous with less reactive magnesia—again depending on the reactivity of other ingredients and the quantity added needs to be increased accordingly. Magnesia reactivity can be effectively measured using the citric acid test discussed earlier.

Another advantage of using ferrous sulphate as an accelerator rather than accelerators such as sodium or potassium sulfates is that iron compounds are generally less soluble than some of the sodium or potassium compounds that form in reactions with unknown components of various wastes and pozzolans with which they may react. The possibility of efflorescence is thus reduced.

A simple experiment illustrates the affect of the addition of small amounts of ferrous sulfate to a cement made with magnesia and fly ash. Several samples were compared for strength over a period. Each sample was made with 50% fly ash and the balance was reactive (citric acid test 22 seconds) magnesia ground to 95% less than 45 micron and 100% loss than 125 micron with ferrous sulfate at ratios given in the table.

The graph shown in FIG. 1 shows strength on the vertical axis determined on an apparatus for measuring comparative compressive and shear strength on an arbitrary linear scale. (The scale is arbitrary in that it has not been equated to standard test units. The results produced by the apparatus are however very consistent and thus can be used for comparison purposes.) The horizontal axis is time.

As can be seen from the graph, at around a 15% $FeSO_4$/MgO (sample 205) strength gain was achieved in the first few hours as compared to pure brucite (sample 202) which did not gain strength for several days.

The cementitious minerals forming in the above example include brucite, ferro brucite, amakinite, iron oxysulfate, magnesium (iron) oxysulfate (see below) haematite and magnetite and near the surface, where access to $CO_2$ is possible, hydromagnesite and magnesite and a magnesium hydroxy sulpho carbonate. Ultimately silicates and aluminates, and their hydrates form very slowly.

Brucite is the main cementing phase and the structure consists of layers of hydroxyls with magnesium in between. $Fe^{++}$ also substitutes for $Mg^{++}$ in brucite and may increase the strength. A fine dispersion of magnetite ($Fe_3O_4$) also often occurs in the structure, possibly also adding to strength.

When a pozzolan such as fly ash or an alternative source of reactive silica and alumina is added to cements containing reactive magnesia the pozzolan reacts in a number of ways previously discussed including reacting with any free lime producing more calcium silicate hydrates if free lime is present such as caused by the addition of Portland clinker as well as surface hydrolysis and geopolymeric reactions occurring.

Other reactions also occur very slowly involving $Mg^{++}$ and $Fe^{++}$ as a suitable environment is formed in which the very slow formation of magnesium (iron) silicates and aluminates occurs. Some minerals formed are not of great strength and are almost gel like such as sepiolite, others are weak such as hydrotalcite and talc but others such as enstatite and forsterite are strong minerals. With rising temperatures through the application of heat using steam for example, many of these reactions proceed more rapidly.

Soluble silicates and aluminates can also be added to advantage encouraging the formation of silicate and aluminate minerals but cost will generally rule out the use of these materials.

Long term strength gain continues in a cement made predominantly from reactive magnesia and is accelerated by moderate heat. (Reaction rates very roughly double with every 10 degree rise in temperature.) As too much heat will decompose $Mg(OH)_2$ and water provides a medium for reaction and encourages further hydration reactions including the hydration of magnesia, the use of steam is ideal.

Another advantage of the compositions of the present invention are that they able to accommodate a wide variety of extraneous cations and anions. Many of these extraneous cations and anions are thought to find their way into the open layered structure of brucite, where if the are toxic, they are rendered inert as long as the brucite does not dissolve.

Because of the high insolubility of brucite, the compositions of the present invention are generally not attacked by soft waters. Surface protection by carbonates ensues with most acid rains.

The high reactive magnesia cement compositions described are also very resistant to sea and ground water attack and this is thought to be because brucite, the main component, is virtually insoluble at the pH of sea water (8.2) and in most ground waters and does not suffer ion replacement or decomposition in the same manner as the calcium silicate hydrate found in Portland cement as portlandite is replaced or leached out.

Tests have confirmed resistance to agents such as glaubers salts, epsom salts, sodium chloride, ammonium nitrate and week organic acids.

The use of several plasticisers has been tested including Neosyn EA which is a sodium salt of naphthalene sulphonic acid polymer with formaldehyde. These appear to work in a manner similar to Portland cement affecting surface charge however in most situations they do not seem to be needed.

In an experiment to reduce the attack by microbes on the high magnesia cements provided for in this specification, copper sulfate was added in small proportions (Less than 5% of the MgO content). It was found that adding copper sulfate in small proportions to mixtures of magnesium oxides and water and magnesium oxides, ground Portland cement clinker and water had a slowing down affect on setting and could therefore be useful as a set retarder for special cements such as required for drill holes.

Other experiments with the purpose of providing higher early strength and reducing initial setting times included the addition of organic polymers and resins. In particular the addition of polyvinyl acetate (PVA), vinylacetate-ethylene, styrene-butyl acrylate, butyl acrylate-methylacrylate and styrene-butadiene were found to be beneficial as well as liquid rubber (latex). Some resins were also tested and found to be beneficial, but with all of these organic additives there is some trade of because of cost.

The invention claimed is:

1. A hydraulic cement composition consisting essentially of:
   a hydraulic cement component;
   a magnesium oxide component; and
   a pozzolan component,
   wherein the magnesium oxide component consists essentially of reactive magnesium oxide hydratable to brucite and prepared by low temperature calcination at a temperature of less than 750° C. from materials excluding dolomite, and substantially ground to a particle size with greater than 95% of the particles less than 120 μm in size, the magnesium oxide component making up at least 5% by weight of a combination of the hydraulic cement component and the magnesium oxide component,
   said composition excluding components which form magnesium oxychlorides and magnesium oxysulfates with the reactive magnesium oxide.

2. The hydraulic cement composition as defined in claim 1, wherein the hydraulic cement component comprises Portland cement.

3. The hydraulic cement composition as defined in claim 1, wherein the hydraulic cement component comprises calcium aluminate cements.

4. The hydraulic cement composition as defined in claim 1, wherein the hydraulic cement component comprises a geopolymer forming cement.

5. The hydraulic cement composition as defined in claim 1, wherein the pozzolan component comprises fly ash.

6. The hydraulic cement composition as defined in claim 1, wherein the pozzolan component comprises ground blast furnace slag.

7. The hydraulic cement composition as defined in claim 1, which is treated by heating or steaming at temperatures in the range 20-1000° C.

8. The hydraulic cement composition as defined in claim 1, wherein the pozzolan comprises at least one component selected from the group consisting of fly ash, flue wastes, slags including iron ore slag, other wastes from the metal production industry, silica fume, ground brick, and sewerage sludge ash.

9. A hydraulic cement composition consisting essentially of:
   at least one a hydraulic cement;
   a magnesium oxide component; and
   optionally, at least one pozzolan,
   wherein the magnesium oxide is at a level of at least 5% by weight of a combination of the at least one hydraulic cement and the magnesium oxide and wherein the magnesium oxide consists essentially of reactive magnesium oxide hydratable to brucite prepared by low temperature calcination at a temperature of less than 750° C. and fine grinding to a particle size with greater than 95% passing 120 μm.

10. A hydraulic cement composition as a defined in claim 9, wherein the hydraulic cement comprises Portland cement.

11. A hydraulic cement composition as defined in claim 9, wherein the composition includes said pozzolan and wherein the pozzolan comprises at least one pozzolan selected from the group consisting of fly ash, flue wastes, slags including iron ore slag, other wastes from the metal production industry, silica fume, ground brick, and sewerage sludge ash.

12. A hydraulic cement composition as defined in claim 9, wherein the hydraulic cement is Portland cement and the composition includes a pozzolan comprising fly ash.

* * * * *